US009628136B2

(12) United States Patent
Braun et al.

(10) Patent No.: US 9,628,136 B2
(45) Date of Patent: Apr. 18, 2017

(54) METHODS AND APPARATUS FOR CONTROLLING MULTIPLE-INPUT AND MULTIPLE-OUTPUT OPERATION IN A COMMUNICATION DEVICE BASED ON A POSITION SENSOR INPUT

(71) Applicant: MOTOROLA MOBILITY LLC, Chicago, IL (US)

(72) Inventors: Mark Braun, Arlington Heights, IL (US); Santhosh Kumar Gillella, Mundelein, IL (US); Ranjeet Gupta, Chicago, IL (US); Mary Hor-Lao, Chicago, IL (US); Sudhir C. Vissa, Bensenville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 14/829,129

(22) Filed: Aug. 18, 2015

(65) Prior Publication Data
US 2016/0380664 A1    Dec. 29, 2016

Related U.S. Application Data

(60) Provisional application No. 62/184,517, filed on Jun. 25, 2015.

(51) Int. Cl.
*H04B 1/38* (2015.01)
*H04B 1/401* (2015.01)
*H04B 1/3827* (2015.01)
*H04B 7/0404* (2017.01)

(52) U.S. Cl.
CPC ........... *H04B 1/401* (2013.01); *H04B 1/3833* (2013.01); *H04B 7/0404* (2013.01)

(58) Field of Classification Search
CPC ........................................................ H04B 1/401
USPC ........................... 455/73, 500, 574; 370/252
See application file for complete search history.

(56) References Cited

U.S. PATENT DOCUMENTS

| | | | | |
|---|---|---|---|---|
| 2002/0094789 A1* | 7/2002 | Harano | .................. | H01Q 1/242 455/575.7 |
| 2010/0289754 A1* | 11/2010 | Sleeman | ............... | G06F 3/0416 345/173 |
| 2013/0040671 A1* | 2/2013 | Zawaideh | ............. | H04W 88/06 455/500 |
| 2014/0038675 A1* | 2/2014 | Khlat | .................... | H03F 1/0227 455/574 |

OTHER PUBLICATIONS

Sanayei, S.: "Antenna selection in MIMO systems", Communications Magazine, IEEE (vol. 42, Issue 10, Oct. 2004, all pages.
Hang Yu, Lin Zhong, Ashutosh Sabharwal: "Power Management of MIMO Network Interfaces on Mobile Systems", Very Large Scale Integration (VLSI) Systems, IEEE Transactions on (vol. 20, Issue 7), Jun. 23, 2011, all pages.

* cited by examiner

*Primary Examiner* — Hsin-Chun Liao

(57) ABSTRACT

A method for disabling multiple-input and multiple-output operation in a communication device includes communicating data using multiple-input and multiple-output operation, wherein the data is communicated using multiple transceiver paths. Further, the method includes receiving position sensor input and disabling at least a portion of one or more transceiver paths, of the multiple transceiver paths, based on the position sensor input.

20 Claims, 7 Drawing Sheets

ମETHODS AND APPARATUS FOR
CONTROLLING MULTIPLE-INPUT AND
MULTIPLE-OUTPUT OPERATION IN A
COMMUNICATION DEVICE BASED ON A
POSITION SENSOR INPUT

RELATED APPLICATIONS

The present application is related to and claims benefit under 35 U.S.C. §119(e) from U.S. Provisional Patent Application Ser. No. 62/184,517, filed Jun. 25, 2015, titled "METHODS AND APPARATUS FOR CONTROLLING MULTIPLE-INPUT AND MULTIPLE-OUTPUT OPERATION IN A COMMUNICATION DEVICE BASED ON A POSITION SENSOR INPUT", the entire contents of which are incorporated herein by reference.

FIELD OF THE DISCLOSURE

The present disclosure relates to controlling multiple-input and multiple-output operation in a communication device, and more particularly to controlling multiple-input and multiple-output operation in a communication device based on a set of parameters that indicates position sensor input.

BACKGROUND

When communicating data, wireless communication devices that are not plugged into a power source rely on a battery source to power their electrical components. Battery resources, however, are finite. Thus, when communicating data while powered by a battery source, devices should consume battery resources in the most efficient manner. Such efficient use includes balancing battery life constraints with communicating data using technology, such as multiple-input and multiple-output (MIMO) operation, which can drain battery life at a much faster rate than communicating data using non-MIMO operation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
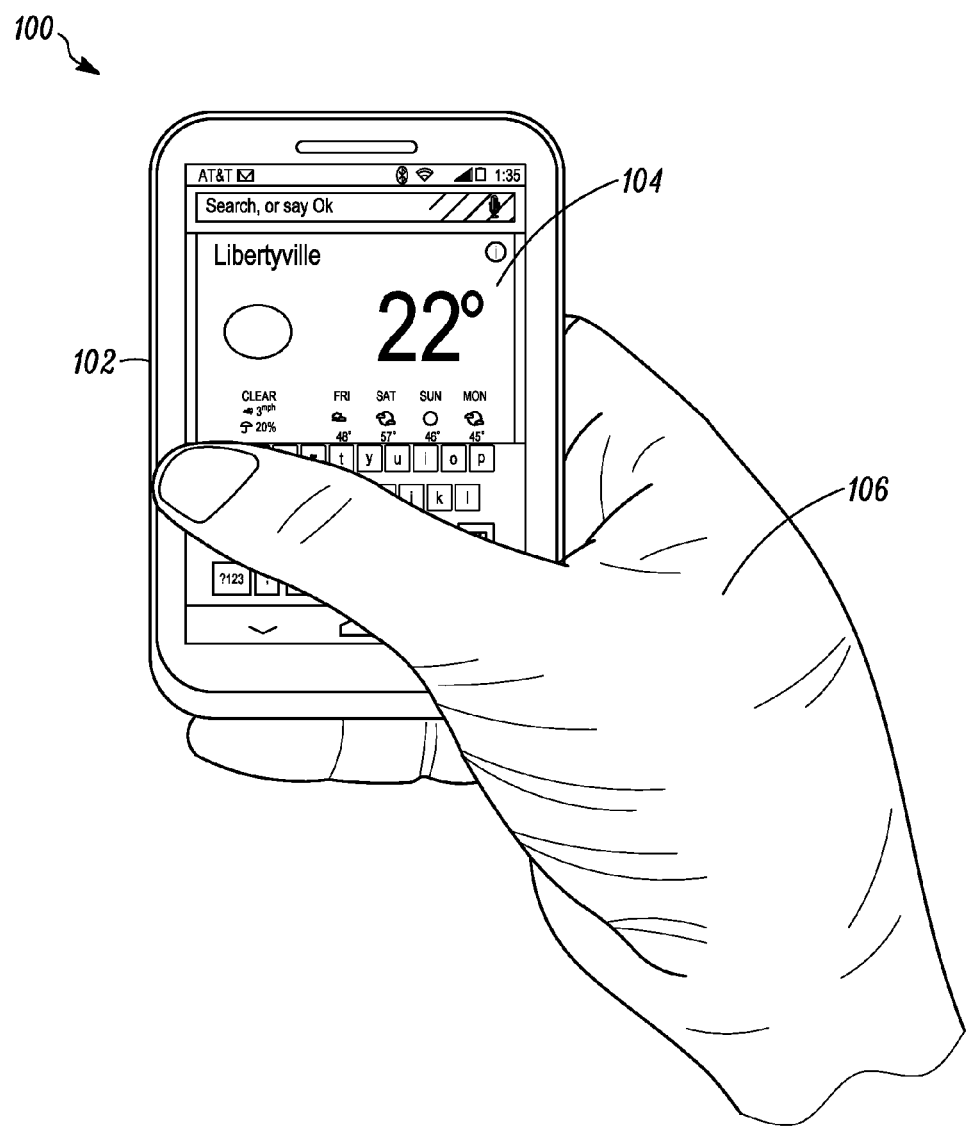
FIG. 1 is a schematic diagram illustrating an environment within which can be implemented methods and apparatus for controlling MIMO operation in a communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, a communication device configured in accordance with the teachings herein can be used to optimize throughput and battery life by optimizing MIMO operation through selectively disabling and enabling MIMO operation of the communication device based on position sensor input also referred to herein as position sensor data, which is an example of position input. For an embodiment, the position sensor input indicates a user's hand position, left-handed or right-handed operation, a display orientation, or an orientation of the communication device. Disabling and enabling MIMO operation includes disabling and enabling one or more transmit paths, one or more receiver paths, and/or one or more transceiver paths (also generally referred to as paths) of multiple transceiver paths of the communications device.

For one embodiment, a method for disabling multiple-input and multiple-output operation in a communication device includes communicating data using multiple-input and multiple-output operation, wherein the data is communicated using multiple transceiver paths. The method also includes receiving position sensor input and disabling at least a portion of one or more transceiver paths, of the multiple transceiver paths, based on the position sensor input.

For another embodiment, a communication device configured for disabling multiple-input and multiple-output operation based on position sensor data includes a transceiver component having multiple transceiver paths and configured to communicate data using multiple-input and multiple-output operation. The communication device also includes at least one sensor configured to generate position sensor data and at least one processor coupled to a transceiver component and the at least one sensor. The at least one processor is configured to receive the position sensor data, determine receiver sensitivity for the multiple transceiver paths, and initiate disabling of at least a portion of one or more transceiver paths, of the multiple transceiver paths, based on the position sensor data and the receiver sensitivity for the multiple transceiver paths.

For example, the at least one sensor includes a first sensor, such as one or more capacitive or infrared sensors, that generates position sensor data that indicates a user's hand position on the communication device. For another example, the at least one sensor includes a second sensor, such as a presence sensor, that generates position sensor data that indicates left-handed or right-handed operation of the communication device. For another example, the at least one sensor includes a third sensor, such as a gyroscope or an accelerometer, that generates position sensor data that indicates a display orientation of the communication device. For yet another example, the at least one sensor includes a fourth sensor, such as a gyroscope or an accelerometer, that indicates an orientation of the communication device.

In yet another embodiment a method for disabling multiple-input and multiple-output operation in a communication device includes communicating data using multiple-input and multiple-output operation, wherein the data is communicated using multiple transceiver paths. The method also includes receiving position input relative to the communication device and disabling at least a portion of one or more transceiver paths, of the multiple transceiver paths, based on the position input.

FIG. 1 illustrates a schematic diagram of an example environment 100 within which can be implemented methods and apparatus for controlling MIMO operation in a communication device. MIMO is a method for multiplying the capacity of a radio link using multiple transceiver paths and corresponding antennas to exploit multipath propagation for communicating data between two wireless devices. The environment 100 includes a communication device 102 having a display 104 being held by a user's hand 106. In one implementation scenario, the communication device 102 communicates with another device using an access point or some other wireless infrastructure equipment using a Wi-Fi® standard, such as 802.11 a, b, g, n, or ac, and in particular operate in accordance with Wi-Fi standards that support MIMO technologies. Example communication devices 102 include a smartphone, a cellular phone, a phablet, a tablet, a personal digital assistant, a mobile phone, a media player, a laptop, or another type of portable electronic device capable of communicating with other devices in accordance with various aspects of the disclosed embodiments.

For an embodiment, the communication device 102 is configured to operate using 802.11 ac high throughput (HT) and very high throughput (VHT) bandwidths, such as HT20, VHT20, HT40, VHT80, VHT160, and the like. These bandwidths can be increased further by using MIMO spatial streams between the communication device 102 and an access point or some other connection to the Internet. In a MIMO system, spatial multiplexing is used to increase throughput for data transmissions by, for example, dividing a high rate data stream into multiple low rate data streams and sending each low rate data stream over the same channel using different antennas. In other words, different data streams are transmitted over the same channel using different antennas. In addition, in a MIMO system, spatial diversity is used to make data transmissions more robust or reliable.

Regardless of whether multiple paths are used to increase throughput or reliability, using MIMO to transmit data via multiple paths requires operating more than one antenna. When one antenna is used to communicate data, the electronic components of the communication device 102 forming the transceiver path associated with that antenna requires power. If more than one antenna is used, then more than one transceiver path is powered in whole or in part. The increased number of operating transceiver paths creates a greater drain on battery resources of the communication device 102. Although MIMO is capable of providing greater throughput and greater reliability, this benefit can come at the cost of greater battery consumption.

Figure 2:
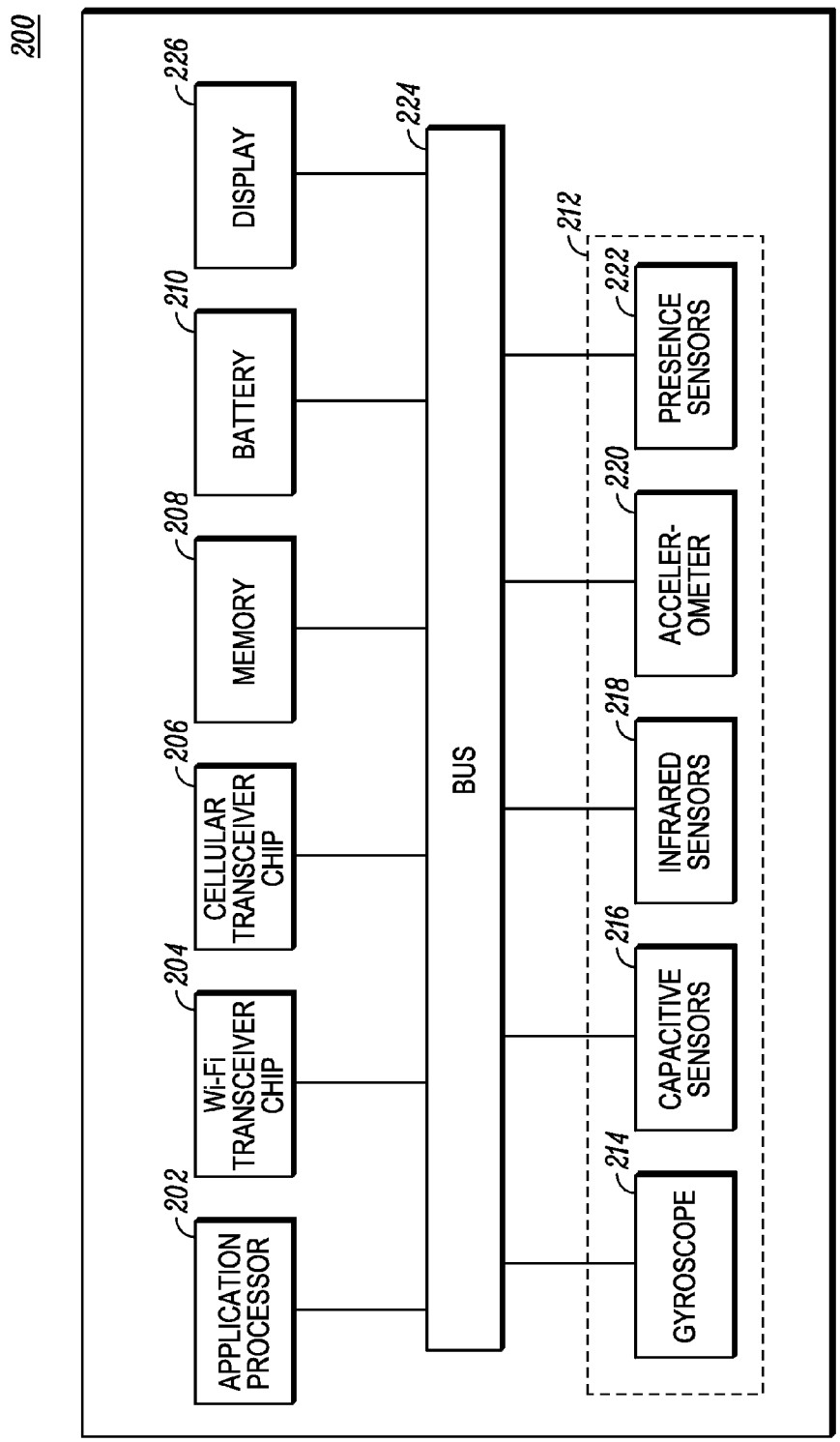
FIG. 2 is a block diagram illustrating example internal components of a communication device configured for controlling MIMO operation in accordance with some embodiments.

Referring now to FIG. 2, therein is provided a block diagram illustrating example internal hardware components 200 of a wireless communication device, such as the communication device 102, in accordance with the present teachings. As shown in FIG. 2, the internal elements or components 200 include one or more processors 202, a Wi-Fi transceiver chip 204, a cellular transceiver chip 206, a memory component 208, a battery 210, sensors 212, and a display 226. As further illustrated, the internal components 200 are coupled to one another, and in communication with one another, by way of one or more internal communication links 224, for instance an internal bus and direct connections with the battery 210. The sensors 212 include a gyroscope 214, capacitive sensors 216, infrared sensors 218, an accelerometer 220, and presence sensors 222. A limited number of device components 202, 204, 206, 208, 210, 212, and 226 are shown for ease of illustration, but other embodiments may include a lesser or greater number of such components. Moreover, other elements needed for a commercial embodiment of a device that incorporates the components shown, such as various input and output components that enable a user to interact with the communication device 102, are omitted from FIG. 2 for clarity in describing the enclosed embodiments.

The processor 202 provides main or core processing capabilities within the communication device 102 and, in an embodiment, serves as a primary processor which processes computer-executable instructions to control operation of the device 102. For example, the processor 202 is an application processor implemented as a system-on-chip (SoC) that supports word processing applications, email and text messaging applications, signaling protocols, video and other image-related and/or multimedia applications, etc., executable on the communication device 102. For another embodiment, the processor 202 provides secondary processing capabilities such as in connection with receiving and interpreting position sensor input or data from the sensors 212.

The Wi-Fi transceiver chip 204 is configured to conduct Wi-Fi communications in accordance with the IEEE 802.11 (e.g., a, b, g, n, or ac) standards using HT/VHT channels and MIMO communication techniques. In other embodiments, the Wi-Fi transceiver chip 204 instead (or in addition) conducts other types of communications commonly understood as being encompassed within Wi-Fi communications such as some types of peer-to-peer, e.g., Wi-Fi Direct™, communications, Neighbor Awareness Networking (NAN) aka Wi-Fi Aware™, and Mobile Hotspot operations. Further, in other embodiments, the Wi-Fi transceiver chip 204 is replaced or supplemented with one or more other wireless transceivers configured for wireless communications including, for example, wireless transceivers employing ad hoc communication technologies such as HomeRF, Home eNode B (Fourth Generation Long Term Evolution (4G LTE) femtocell), and/or other wireless communication technologies.

The cellular transceiver chip 206 is configured to conduct cellular communications of data over wireless connections using any suitable wireless technology, such as Third Generation (3G), 4G, LTE, etc., vis-à-vis cell towers or base stations. In other embodiments, the wireless transceiver chip 206 is configured to utilize any of a variety of other cellular-based communication technologies to conduct, for instance: analog communications using, e.g., Advanced Mobile Phone System (AMPS); digital communications using, e.g., Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or next generation communications using, e.g., Universal Mobile Telecommunication System (UMTS), Wideband CDMA (WCDMA), LTE, Institute of Electrical and Electronics Engineers (IEEE) 802.16, etc.; or variants thereof.

The memory component 208 in various embodiments can include one or more of: volatile memory elements, such as random access memory (RAM); or non-volatile memory elements, such as a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), or a Flash memory. In an embodiment, the memory component 208 includes a region of shared memory accessible to various components 200 of the communication device 102, such as the application processor 202 and the cellular transceiver chip 206.

The battery 210 provides power to the other internal components 200 while enabling the communication device 102 to be portable. For an embodiment, the display is a touch-screen display that accepts tactile input from a user and also provides a display output interface for the user.

The gyroscope 214 generates and provides position sensor data or input to a processor, which indicates orientation based on rotation or angular momentum around multiple axes, e.g., the X, Y, and Z axes. The accelerometer 220 generates and provides position sensor data or input to a processor, which indicates orientation based on linear motion and gravity.

Accordingly, the gyroscope 214 and accelerometer 220 can be used alone or in combination to indicate position and orientation relative to the communication device 102. For instance, the gyroscope 214 and accelerometer 220 can be used alone or in combination to indicate a display orientation (e.g., landscape or portrait) of the communication device 102 or an orientation of the communication device 102 itself along multiple axes, e.g., the X, Y, and Z axes. In one embodiment, the gyroscope 214 and accelerometer 220 are separate sensors of the electronic device 102. Alternatively, the gyroscope 214 and accelerometer 220 are combined within the same hardware such as in an integrated circuit manufactured using microelectromechanical systems (MEMS) technology.

The capacitive sensors 216, infrared sensors 218, and presence sensors 222 alone or in combination can be used to indicate to a processor a user's absolute hand position on or relative to the communication device 102. The capacitive sensors 216, infrared sensors 218, and presence sensors 222 alone or in combination can further be used to indicate to a processor a right-handed or left-handed grip on or operation of the communication device 102 by a user. These sensors 216, 218, and 222 can be positioned around the perimeter of the communication device 102), for instance at its corners, and on the backside of the communication device 102.

Particularly, the capacitive sensors 222 generate and provide position sensor data or input to a processor, which indicates hand position based on capacitive coupling using human body capacitance as an input. The infrared sensors 218 generate and provide position sensor data or input to a processor, which indicates hand position based on measurements of infrared light radiating from objects in its field of view. The presence sensors 222 generate and provide position sensor data or input to a processor, which indicates hand position based on detecting distance and absence or presence of an object, for instance using infrared technology. In one example, position sensor data is from a physical sensor, such as a gyroscope 214, a capacitive sensor 216, an infrared sensor 218, or a presence sensor 222. Alternatively, a virtual sensor, or soft sensor, processes data from one or more physical sensors, where the processing for virtual sensors for physical sensor data is done in the processor 202.

Figure 3:
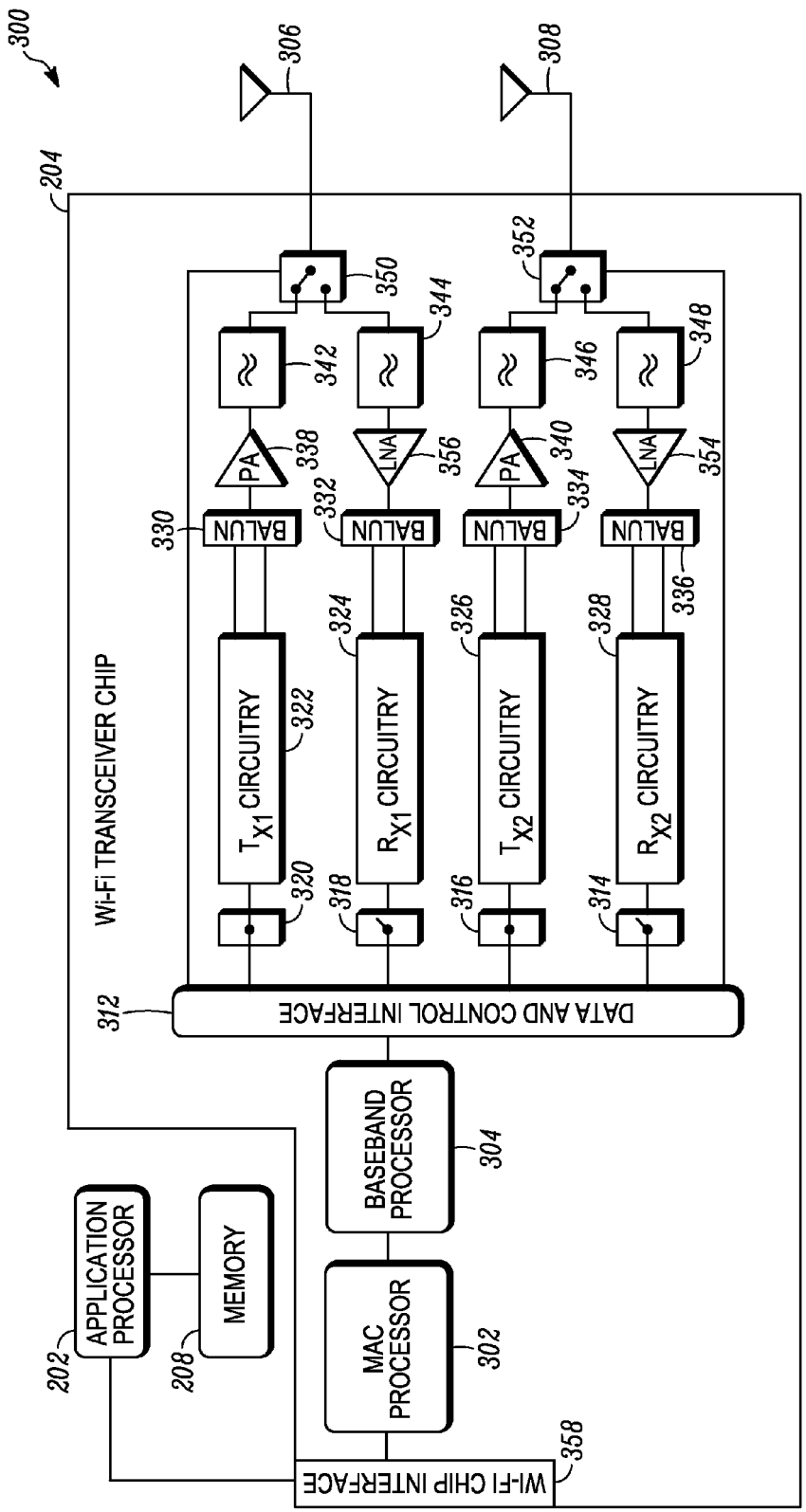
FIG. 3 is a schematic diagram of a communication device architecture configured for controlling MIMO operation in accordance with some embodiments.

FIG. 3 is a schematic diagram of various internal hardware components 300 of the communication device 102 configured to execute a variety of functions associated with MIMO operation of the communication device 102. The components 300 include the application processor 202, the memory 208 and a transceiver component. For this example, the transceiver component is the Wi-Fi transceiver (XCVR) chip 204. However, in another embodiment, the transceiver component could be the cellular transceiver chip 206. As illustrated, the Wi-Fi transceiver chip 204 includes a media access control (MAC) processor 302, a baseband processor 304, a data and control interface 312, and multiple transceiver paths that enable the MIMO operation.

As shown, each transceiver path includes a transmit path and a corresponding receive path both connected to a same antenna. For example, a first transceiver path includes a transmit (Tx) path having a switch 320, Tx1 circuitry 322, a balun 330, a power amplifier (PA) 338, and a filter 342 coupled through a duplexer 350 to an antenna 306. A corresponding receive (Rx) path of the first transceiver path includes a switch 318, Rx1 circuitry 324, a balun 332, a low noise amplifier (LNA) 356, and a filter 344 coupled through the duplexer 350 to the antenna 306. Similarly a second transceiver path includes a transmit path having a switch 316, Tx2 circuitry 326, a balun 334, a power amplifier 340, and a filter 346 coupled through a duplexer 352 to an antenna 308. A corresponding receive path of the second transceiver path includes a switch 314, Rx2 circuitry 328, a balun 336, a low noise amplifier 354, and a filter 348 coupled through the duplexer 352 to the antenna 308.

The application processor 202 is coupled to the Wi-Fi transceiver chip 204 by way of a bus (e.g., a peripheral component interconnect express or secure digital input/output bus), which communicates signals and data to various components of the chip 204 through a Wi-Fi chip interface 358. Such signals and data can include various statistics and measurements, determined by the application processor, related to the quality of the connections that the communication device 102 has established with an external device. Such statistics are also referred to herein as parameters that indicate quality of service associated with communicating data to another (external) device.

The MAC processor 302 performs signaling functions associated with establishing and maintaining a MAC layer connection with devices external to the communication device 102, such as an access point. The MAC processor 302 is also configured to track various statistics and measurements related to MAC layer operations including statistics related to the quality of the connections that the communication device 102 has established with an external device. These statistics are also referred to herein as parameters that indicate quality of service associated with communicating data to another (external) device.

The baseband processor 304 manages radio control functions, such as signal generation and encoding. Illustratively, when the communication device 102 is transmitting data, the baseband processor 304 propagates a digital baseband signal through a transmit path. The baseband signal is a signal used to modulate a carrier wave and is defined by an in-phase (I) component and a quadrature (Q) component. The I component is a zero phase cosine component, and the Q component is a phase $\Pi/2$ sine component.

In an example illustration of communicating a signal through a transmit path, the baseband signal is communicated to transmit circuitry Tx1 322. The transmit circuitry 322 include elements not pictured such as: digital to analog converters to convert the baseband signals from digital to analog form; baseband filters to remove harmonic distortions and alias components in the baseband signals; and IQ modulators, also referred to in the art as frequency mixers and multipliers, to mix the baseband signals with in-phase and quadrature carrier signals of a carrier signal having a carrier frequency constructed using a local oscillator to up-convert the baseband signal to a higher frequency modulated radio frequency signal in differential form.

The I and Q components of the RF signal are communicated to the balun 330, which converts the I and Q signal components from differential to single ended form. Power amplifier 338 provides an additional power gain stage to the signal, and the filter 342 filters frequencies outside the transmit band. In response to signals from a data and control interface 312, the duplexer 350 is configured to connect the filter 342 to the antenna 306. The antenna 306 radiates the signal for reception by another device, such as, an access point.

When the communication device 102 receives a signal, the data and control interface 312 controls the duplexer 350 to connect the filter 344 to the antenna 306. The antenna 306 then propagates the signal to filter 344 which filters frequencies outside the receive band. The LNA 356 amplifies the signal and propagates the amplified signal to the balun 332. The balun 332 converts the I and Q signal components from single ended to differential form, which are passed to the receive circuitry 324. The receive circuitry 324 downconverts the RF signal to its I and Q baseband components in a process that is reverse to the process described in relation to transmit circuitry 322, using an IQ demodulator, baseband filter, and analog to digital converter (ADC). The signal is then passed to the baseband processor 304. The resultant signal is provided to the MAC processor 302 and/or the application processor 202 for further processing. Similarly, the components 312, 316, 326, 334, 340, 346, and 352 are configured to transmit a signal using antenna 308. The antenna 308 is also configured to receive a signal and propagate the signal to the baseband processor 304 via the components 352, 348, 354, 336, 328, 314 and 312.

Although this embodiment illustrates the transceiver chip 204 with two transceiver paths (e.g., MIMO 2×2) each having a transmit path and a corresponding receive path, in other embodiments the Wi-Fi transceiver chip 204 is configured with more than two transceiver paths. For one alternative embodiment, chip 204 includes four transceiver paths to enable MIMO 4×4 operation. In still other embodiments, the chip 204 includes even more transceiver paths. Moreover, the embodiment shown in FIG. 3 supports 5 GHz operations. However, additional components can be added to simultaneously support 2.4 GHz operations. For example, for each Rx path, 2.4 GHz operation would have a separate LNA and IQ demodulator. However, the baseband filter and ADCs may be shared with 5 GHz Rx. For each Tx chain, 2.4 GHz operation would have a separate IQ modulator and PA. The baseband filter and DACs could be shared with the 5 GHz Tx. Additionally, each path would have a Diplexer to combine the 2.4 GHz and 5 GHz operations to a single antenna, if a shared antenna is used, as is the case for many smartphones.

When a transceiver path or MIMO operations in general of the communication device 102 is "disabled", one or more components of the transceiver path(s) is disabled or prevented from operating, and/or power to one or more transceiver paths of the communication device 102 is reduced in whole (e.g., disconnected) or part. A partial or a full disabling of a transceiver path or of MIMO operation in general, thereby, partially or fully reduces the power consumed by the transceiver path(s). Likewise, the term "enable" includes both a partial and a full enabling of a transceiver path or of MIMO operation in general.

For one embodiment, a full disabling of MIMO operation means using a single transceiver path at a time to both transmit and receive data. By contrast, partial disabling of MIMO operation means only some MIMO functionality is disabled. For one example, the MIMO operation is reduced from MIMO 4×4 to MIMO 2×2. In another example, downlink communications on a receive path are carried out using MIMO operation, while corresponding uplink communications on a transmit path are carried out using non-MIMO communications. Thus, a transmit path of at least one transceiver path is disabled while the receive path remains enabled. For yet another example, uplink communications on a transmit path are carried out using MIMO operation, while corresponding downlink communications on a receive path are carried out using non-MIMO communications. Thus, a receive path of at least one transceiver path is disabled while the transmit path remains enabled. For another embodiment, MIMO operation is disabled for some data rates but not for others.

Figure 4:
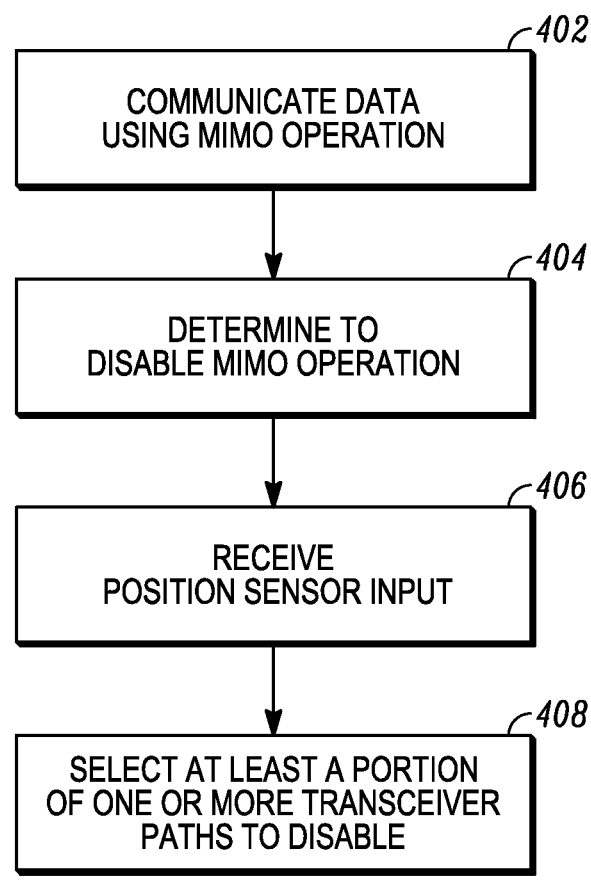
FIG. 4 is a flow diagram illustrating an example of a method for controlling MIMO operation in a communication device in accordance with some embodiments.

FIG. 4 is a flow diagram illustrating an example of a method 400 for controlling MIMO operation in a communication device, such as the communication device 102, based on position sensor input in accordance with some embodiments. During some instant in time, the communication device 102 is enabled to communicate data 402 using MIMO operation. For instance, the communication device 102 is in a state where it is enabled 402 for MIMO operation for Wi-Fi® communications. In this example, when MIMO is enabled, both transceiver paths are connected to the baseband processor using switches 320, 318, 316, and 314 to transmit and receive data.

Components of the first and second transceiver paths drain energy from the battery 210. Accordingly, there may be scenarios where the multi-path advantages of MIMO are not worth the extra drain on the battery required to fully operate all the transceiver paths of the communication device 102. For example, if the communication device 102 is operating in an unstable radio frequency (RF) environment there may be instances when the quality of service is low. An unstable wireless connection in the downlink (e.g., transmissions from the access point to the communication device 102) results in a high bit error rate (BER), a high packet error rate (PER), and/or a high packet loss, which leads to a low quality of service. An unstable connection in the uplink direction can lead to an inordinate number of packet retransmissions at the MAC and/or network layer, large retransmission timer results for collision avoidance, or a higher PER.

In accordance with the prior art, when the quality of service is low, for example when one or more of these corresponding parameters exceeds a threshold, MIMO is enabled to use multi-path communications for greater reliability. Using MIMO, however, creates a greater battery drain. When the link between the communication device 102 and access point is unstable, the communication redundancy that MIMO provides may not provide a quality of service that is worth the current drain needed to power multiple transceiver paths. In such scenarios, the communication device 102 determines 404 to disable MIMO operation. Disablement of MIMO in accordance with embodiments described herein can provide for a more efficient usage of battery power. More specifically, the disclosed embodiments as illustrated by flow diagrams shown in FIG. 4 and FIG. 5 can be used to intelligently select based on position sensor input which particular one or more transceiver paths, in whole or part, to disable given the current operating conditions.

Figure 6:
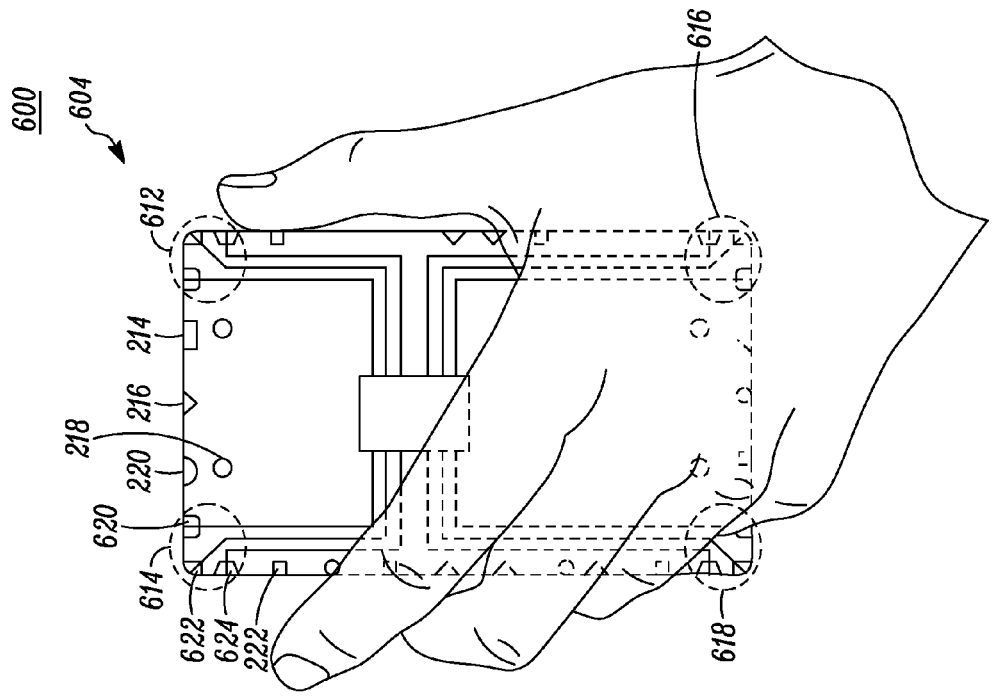
FIG. 6 is a diagram illustrating an example of controlling MIMO operation of a communication device while in a portrait orientation in accordance with some embodiments.
Figure 6:
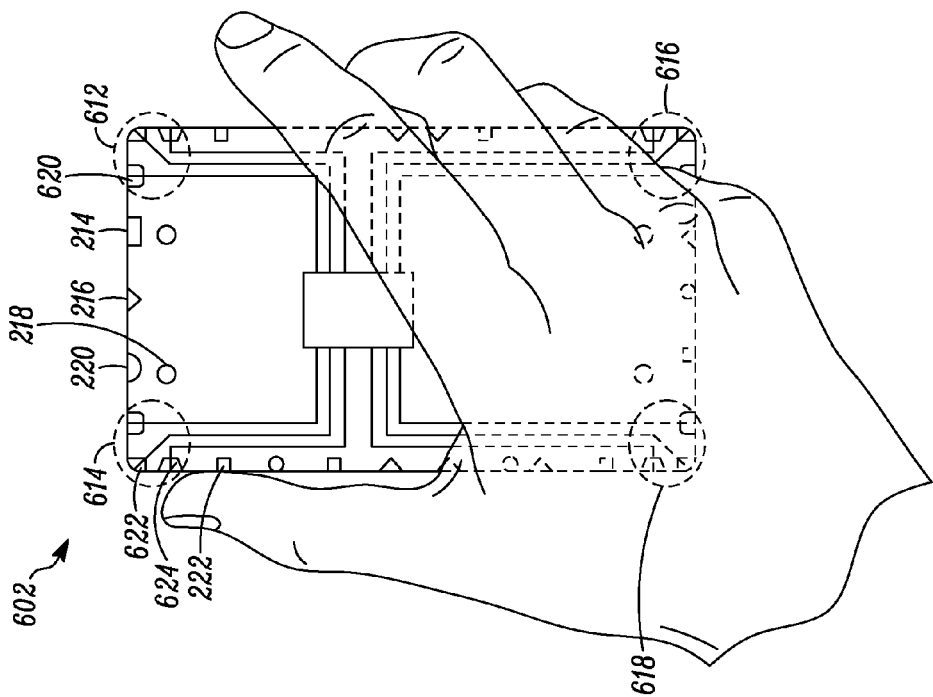
Figure 7:
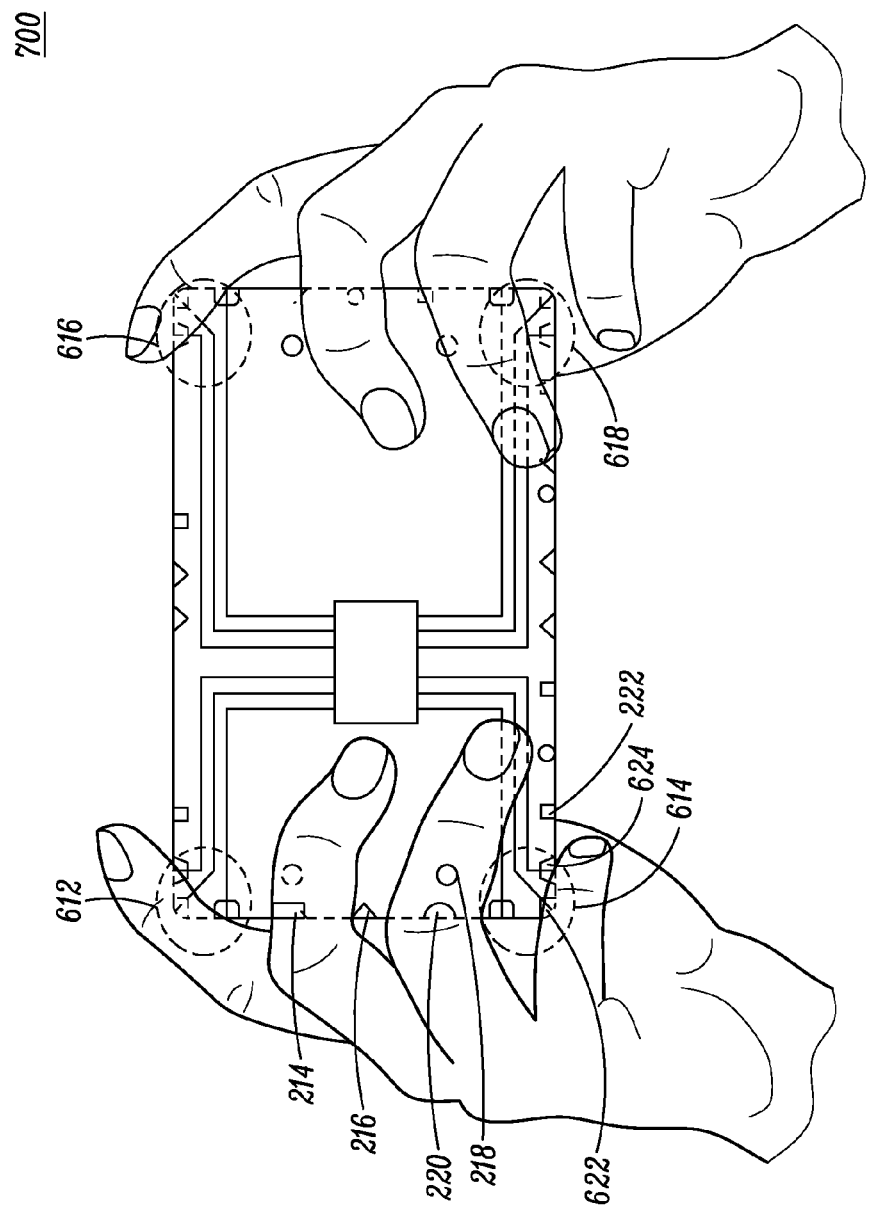
FIG. 7 is a diagram illustrating an example of controlling MIMO operation of a communication device while in a landscape orientation in accordance with some embodiments.

Returning to method 400, the communication device 102, for example the processor 202, receives 406 position sensor input from the sensors 212 and selects 408 a portion of one or more transceiver paths to disable based on the received position sensor input. The position sensor input or position sensor data is simply data from one or more sensors, such as one or more of the sensors 212. For example, the position sensor input includes input that indicates one or more of the following: a user's hand position on the communication device; left-handed or right-handed operation of the communication device; a display orientation of the communication device (e.g., portrait as shown in FIG. 6 or landscape as shown in FIG. 7); or a more detailed orientation of the communication device 102.

When a transceiver path or MIMO operations in general of the communication device 102 is "disabled", one or more components of the transceiver path(s) is disabled or prevented from operating, and/or power to one or more transceiver paths of the communication device 102 is reduced in whole (e.g., disconnected) or part. A partial or a full disabling of a transceiver path or of MIMO operation in general, thereby, partially or fully reduces the power consumed by the transceiver path(s). Likewise, the term "enable" includes both a partial and a full enabling of a transceiver path or of MIMO operation in general.

For one embodiment, a full disabling of MIMO operation means using a single transceiver path at a time to both transmit and receive data. By contrast, partial disabling of MIMO operation means only some MIMO functionality is disabled. For one example, the MIMO operation is reduced from MIMO 4×4 to MIMO 2×2. In another example, downlink communications on a receive path are carried out using MIMO operation, while corresponding uplink communications on a transmit path are carried out using non-MIMO communications. Thus, a transmit path of at least one transceiver path is disabled while the receive path remains enabled. For yet another example, uplink communications on a transmit path are carried out using MIMO operation, while corresponding downlink communications on a receive path are carried out using non-MIMO communications. Thus, a receive path of at least one transceiver path is disabled while the transmit path remains enabled. For another embodiment, MIMO operation is disabled for some data rates but not for others.

In some implementations, to initiate disabling MIMO, the media access control processor 302 communicates a signal via the baseband processor 304 to the data and control interface 312 which responsively disables, in whole or part, at least one transceiver path of the multiple transceiver paths of the communication device 102. In this example, the communication device 102 has two transceiver paths, so fully disabling MIMO operation includes disabling one transceiver path and using the one remaining enabled transceiver path to communicate data. By contrast, partially disabling MIMO means disabling only the receive path of one of the transceiver paths and leaving the corresponding transmit path enabled.

For one particular scenario, the communication device 102 includes a table or some other type of structure that includes entries to guide the selection of the one or more transceiver paths to disable in whole or in part. For example, where the position sensor input indicates that the user has a left-handed grip on the communication device 102, the transceiver path that is closest to the user's hand is disabled since the hand placement likely causes interference with transmission and/or reception using that transceiver path.

This manner of disabling based on which transceiver path is impacted by the user's hand placement relative to the communication device 102 could also be applied to right-handed operation of the device, if the user is holding the device in a portrait or landscape orientation, or any other way in which the user is holding the device. The various position sensor data from the sensors could be mapped to entries in the look-up table to select the transceiver path or paths to disable and whether to disable just the transmit or the receive path or both the transmit and receive path. In one embodiment, at least part of the look-up table is populated during factory programming of the communication device 102.

For another embodiment, at least part of the look-up table is populated through a training sequence that the user is walked through once or periodically. For example, the user is asked to hold the device 102 in various orientations and with her different hands to collect data regarding which transceiver paths are impacted, in order to populate the look-up table. For yet another embodiment, the communication device 102 implements an algorithm to determine which paths to disable in whole or part. For instance, each orientation gives a higher priority to one particular antenna. Additionally, different weighting could be given depending on which sensor data is evaluated if some sensor data has proven more reliable than other sensor data.

Moreover, in the case, for instance, where there are two transceiver paths, one transceiver path may be designated as a "primary" transceiver path and the other as a "secondary" transceiver path due to the secondary transceiver path having a lower maximum performance rating than the primary transceiver path. Namely, under ideal or near ideal operation, for instance with minimal interference, the primary transceiver path has a higher sensitivity by a number of decibels (dB). In accordance with prior art, the secondary transceiver path would always be disabled in favor of the presumptively better performing primary transceiver path. However, in accordance with disclosed embodiments, the communication device 102 could disable MIMO operation by intelligently selecting the primary transceiver path to disable based on the position sensor input.

In some scenarios, the differing position sensor data could give conflicting indications of which transceiver path to disable. In such a case, another embodiment provides for the communication device 102 to evaluate additional factors or parameters to determine which transceiver path or paths to disable in whole or in part. For example, selecting which portion or entirety of one or more transceiver paths to disable is further based on at least one of: receiver sensitivity, cellular performance, cellular band of operation, and impedance value measured for each antenna. For an additional embodiment, the communication device 102, through its sensors 212 and processor 202 for instance, continues to monitor the position sensor input. Where the communication device 102 detects a change in the position sensor input, the communication device 102 re-enables the at least a portion of one transceiver path (that was previously disabled) while disabling at least a portion of another transceiver path based on the change in the position sensor input.

Figure 5:
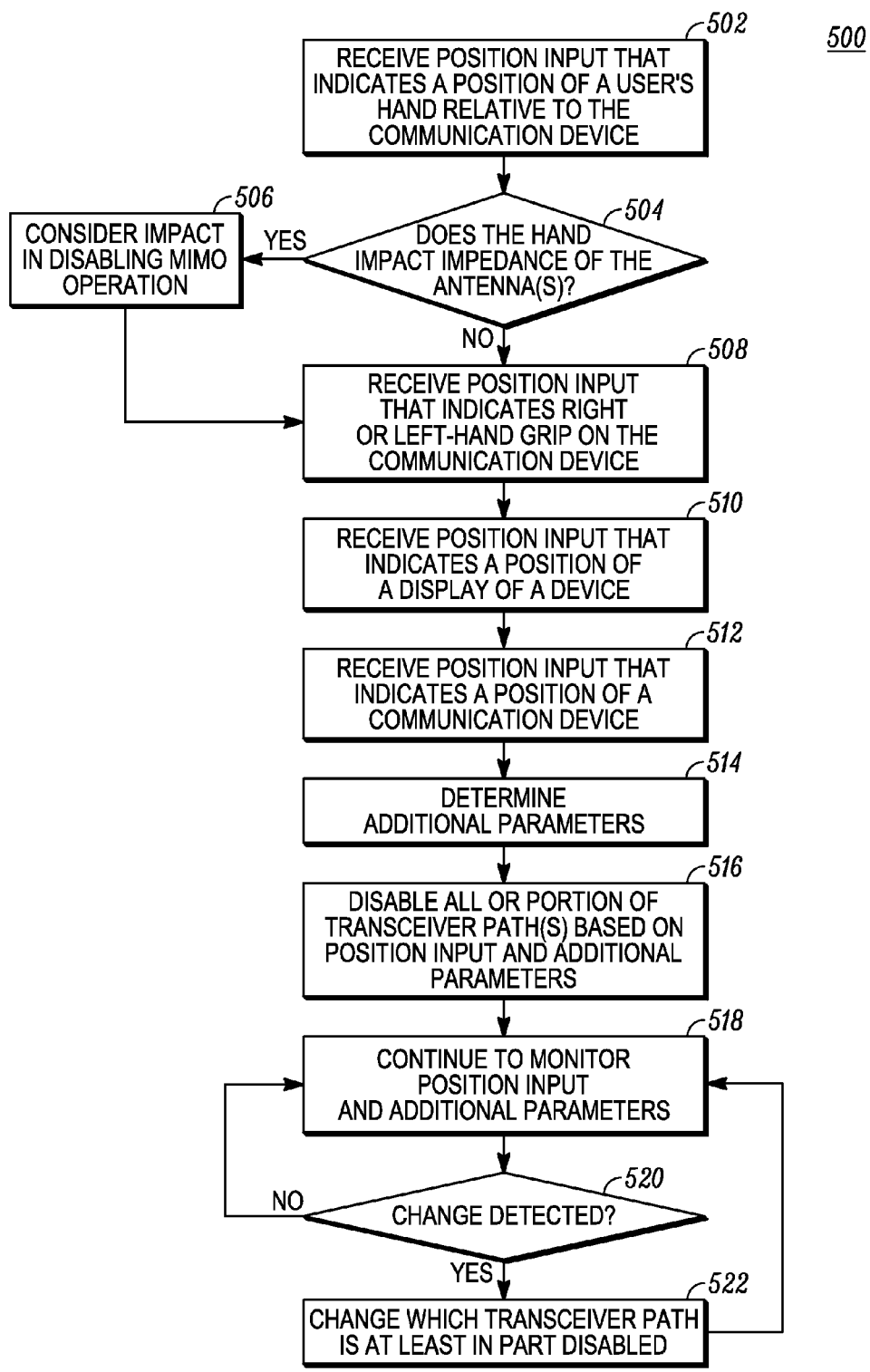
FIG. 5 is a flow diagram illustrating an example of a method for controlling MIMO operation in a communication device when communicating data in accordance with some embodiments.

Consideration of these additional parameters beyond sensor data provided by the sensors 212 are illustrated by reference to FIG. 5. Particularly, FIG. 5 is a logical flow diagram illustrating an example of a method 500 for controlling MIMO operation in a communication device, e.g., 102, when communicating data in accordance with some embodiments. According to method 500, the communication device 102 receives position input relative to the communication device. The position input includes position sensor input or data from the sensors 212. More particularly, the communication device 102, e.g., via the processor 202, receives: at 508, position input that indicates right-hand or left-hand grip on the communication device; at 510, position input that indicates a position of a display of the communication device; and position input that indicates a position of the communication device 102.

However, in accordance with FIG. 5, the communication device 102 receives other types of position input relative to the communication device 102. Particularly, the communication device 102 receives, at 502, position input that indicates a position of a user's hand relative to the communication device 102. For one example, the position input does not reflect a direct sensing, e.g., through capacitive or IR sensing, of actual placement of the user's hand on the device 102 but provides an indication of such placement near one or more transceiver paths.

For instance, the position input indicates the user's hand is impacting an impedance of an antenna coupled to a particular transceiver path or transceiver path portion. Accordingly, the position input indicates determinations or measurements of impedance value for each antenna and a further determination 504 of whether the impedance value of any antenna has degraded. This degradation can indicate that a user's hand or hands are covering and causing interference to a particular transceiver path.

FIG. 6 shows an example indicated at 600 of the impact of a user's hand on the communication device 102, while holding the device in a portrait orientation. FIG. 7 shows an example indicated at 700 of the impact of a user's hand on the communication device 102, while holding the device in a landscape orientation. The communication device 102 is configured with a number of sensors devices 212 and a plurality of antennas elements 612, 614, 616, 618 connected to transceiver paths. The sensor devices 212 include a gyroscope 214, capacitive sensors 216, infrared sensors 218, an accelerometer 220 and a presence sensor 222.

Although the sensor devices 212 are shown in a particular location on the communication device 102, this does not preclude arranging the sensors devices 212 in any particular area of the device 102. Moreover, four antennas 612, 614, 616, 618 are shown as part of FIG. 6 and FIG. 7, but in other embodiments, a communication device can be configured with a fewer or greater number of antennas. In the depiction shown, each antenna, for example 614, includes three antenna elements including a Wi-Fi antenna element 620, a cellular antenna element 622, and a Bluetooth antenna element 624. Although the example depicted shows three antennas elements per "antenna", in other examples, fewer, more, or different types of antenna elements are included, for example global positioning system (GPS) and near field communications (NFC).

The depiction in 604 shows the communication device 102 held in an orientation similar to the orientation shown in 602, but in 604 the user is holding the communication device using the left hand instead of her right hand. Consequently, a different set of antenna elements are exposed 612, 614, in 602 and 604, partially covered 616 and fully covered 618 in 602, or partially covered 618 and fully covered 616 in 604. FIG. 7, shows the communication device 102 being held in a landscape orientation using both hands. Again, a different set of antenna elements are exposed, partially covered 612, 616, or fully covered 614, 618.

The communication device 102 can then consider 506 the impact on antenna impedance when determining which transceiver path or paths to disable in whole or in part. Looking at view 602, for example, where the user is holding the communication device 102 in the portrait orientation in her right hand, the impedance of the antenna elements for the Wi-Fi antenna 616 and 618 might be negatively impacted as compared to the impedance of the antenna elements for the Wi-Fi antenna 612 and 614, which would lead toward a disabling of the Wi-Fi antennas 616 and 618.

However, before making a final determination 516 of which one or more transceiver path or paths to disable in whole or part, the communication device 102 determines 514 additional parameters and factors these additional parameters into its determination 516. These additional parameters include, but are not limited to, one or more of receiver sensitivity, cellular performance, or cellular band of operation. Any of these parameters can be used as a confirmation for which path or paths to disable or as one of many factors that is considered in an algorithm implemented by the device 102 to determine exactly how best to disable MIMO.

Regarding receiver sensitivity, which would typically be determined in a transceiver and communicated to the processor 202, for instance where there are two transceiver paths as shown in FIG. 3, the communication device 102 monitors both paths to determine quality of service on both paths. For example, the communication device 102 determines which path has the lowest BER and, hence, the least amount of errors and/or which path has the best RSSI, and uses this data to determine which path to disable. Using the quality of service data, the communication device 102 could in a further embodiment determine sensitivity as being the smallest amount of power that can be put into the receiver such that the receiver can still maintain reliable communication. Alternatively, the communication device 102 can determine Total Isotrophic Sensitivity (TIS) as an average sensitivity of the receiver-antenna system for use in selecting a transceiver path to disable.

Regarding cellular performance and cellular band of operation, for one example, the communication device 102 uses indicators of the cellular sub-system (e.g., the cellular transceiver(s) and supporting hardware) to determine whether to disable one or more transceiver paths of the Wi-Fi sub-system (e.g., the Wi-Fi transceivers and supporting hardware). For example, where a cellular antenna and a Wi-Fi antenna have a physical proximity (or share an antenna), a degradation in cellular performance, as indicated through quality of service indicators such as BER and RSSI or other method of determining antenna desense for instance, can also indicate a possible degradation in performance of the proximate Wi-Fi antenna. Accordingly, where for example, the communication device 102 detects the LTE antenna performance being desensed, and the Wi-Fi antenna is in proximity to the LTE antenna (or shares the LTE antenna), the communication device 102 might disable that proximate Wi-Fi antenna. The same type of analysis could be performed based on a Bluetooth antenna desense.

Furthermore, a particular cellular band in which the communication device 102 is operating or actively communicating could impact the performance of a Wi-Fi antenna close by. For a particular example, where the communication device 102 is performing MIMO communication in the 2.4 GHz Wi-Fi band, performance degradation from interference could ensue for a Wi-Fi antenna that is close to an LTE antenna operating in band 7 or 40. In that case, the communication device 102 might determine to disable the proximate Wi-Fi antenna.

Further for method 500, the communication device 102 continues to monitor 518 position input and the one or more other parameters. The communication device 102 also continues to determine whether it is inefficient to use MIMO operation. If a change is detected 520 in position input or one or more of the other parameters, the communication device 102 can recheck the look-up table and/or reapply the algorithm and, if appropriate, change which transceiver path is at least in part disabled, where MIMO operation continues to be inefficient.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

The term "coupled" as used herein is defined as directly or indirectly connected, mechanically, electrically, inductively, or otherwise. Moreover, in some instances coupled may also mean included within. For example, the MAC processor 302 being "coupled" to the Wi-Fi transceiver chip 204 can mean that the MAC processor 302 is included as a component on the chip 204.

A device or structure that is "configured" in a certain way is configured in at least that way, but may also be configured in ways that are not listed. As used herein, the terms "configured to", "configured with", "arranged to", "arranged with", "capable of" and any like or similar terms mean that hardware elements of the device or structure are at least physically arranged, connected, and or coupled to enable the device or structure to function as intended.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for disabling multiple-input and multiple-output operation in a communication device, the method comprising:
    communicating data using multiple-input and multiple-output operation, wherein the data is communicated using multiple transceiver paths;
    receiving position sensor input;
    determining receiver sensitivity for the multiple transceiver paths;
    disabling at least a portion of one or more transceiver paths, of the multiple transceiver paths, based on the position sensor input and the receiver sensitivity for the multiple transceiver paths.

2. The method of claim 1, wherein the position sensor input comprises input that indicates a user's hand position on the communication device.

3. The method of claim 1, wherein the position sensor input comprises input that indicates left-handed or right-handed operation of the communication device.

4. The method of claim 1, wherein the position sensor input comprises input that indicates a display orientation of the communication device.

5. The method of claim 1, wherein the position sensor input comprises input that indicates an orientation of the communication device.

6. The method of claim 1, wherein disabling a portion of one or more transceiver paths is further based on at least one of: receiver sensitivity, cellular performance, and cellular band of operation.

7. The method of claim 1, wherein each transceiver path is coupled to a different antenna, the method further comprising determining an impedance value for each antenna, wherein the disabling of the at least a portion of the one or more transceiver paths is based on the impedance value determined for each antenna.

8. The method of claim 1, wherein the multiple transceiver paths comprises a primary transceiver path and a secondary transceiver path having a lower maximum performance rating than the primary transceiver path, wherein at least a portion of the primary transceiver path is disabled based on the position sensor input.

9. The method of claim 1, wherein the position sensor input comprises at least two of: first input that indicates a user's hand position on the communication device; second input that indicates left-handed or right-handed operation of the communication device; third input that indicates a display orientation of the communication device; or fourth input that indicates an orientation of the communication device, wherein at least a portion of a first transceiver path is disabled based on the position sensor input.

10. The method of claim 9 further comprising:
continuing to monitor the position sensor input;
detecting a change in at least one of the first, second, third, or fourth inputs;
re-enabling the at least a portion of the first transceiver path while disabling at least a portion of a second transceiver path based on the change in the at least one of the first, second, third, or fourth inputs.

11. The method of claim 9, wherein at least two of the first, second, third, or fourth inputs indicate different transceiver paths to disable, the method further comprising determining receiver sensitivity for the multiple transceiver paths, wherein selecting the at least a portion of the first transceiver path to disable is based on the receiver sensitivity.

12. A communication device configured for disabling multiple-input and multiple-output operation based on position sensor data, the communication device comprising:
a transceiver component having multiple transceiver paths and configured to communicate data using multiple-input and multiple-output operation;
at least one sensor configured to generate position sensor data;
at least one processor coupled to the transceiver component and the at least one sensor, wherein the at least one processor is configured to:
receive the position sensor data;
determine receiver sensitivity for the multiple transceiver paths;
initiate disabling of at least a portion of one or more transceiver paths, of the multiple transceiver paths, based on the position sensor data and the receiver sensitivity for the multiple transceiver paths.

13. The communication device of claim 12, wherein the at least one sensor comprises at least one of:
a first sensor that generates position sensor data that indicates a user's hand position on the communication device;
a second sensor that generates position sensor data that indicates left-handed or right-handed operation of the communication device;
a third sensor that generates position sensor data that indicates a display orientation of the communication device; or
a fourth sensor that generates position sensor data that indicates an orientation of the communication device.

14. A method for disabling multiple-input and multiple-output operation in a communication device, the method comprising:
communicating data using multiple-input and multiple-output operation, wherein the data is communicated using multiple transceiver paths;
receiving position input relative to the communication device;
determining receiver sensitivity for the multiple transceiver paths;
disabling at least a portion of one or more transceiver paths, of the multiple transceiver paths, based on the position input and the receiver sensitivity for the multiple transceiver paths.

15. The method of claim 14, wherein the position input indicates a position of a user's hand relative to the communication device.

16. The method of claim 15, wherein the position input indicates the user's hand is impacting an impedance of an antenna coupled to the disabled transceiver path or transceiver path portion.

17. The method of claim 14, wherein the position input indicates right-hand or left-hand grip on the communication device.

18. The method of claim 14, wherein the position input indicates a position of a display of the communication device.

19. The method of claim 14, wherein the position input indicates a position of the communication device.

20. The method of claim 14 further comprising:
continuing to monitor the position input;
detecting a change in the position input;
changing which one of the one or more transceiver paths is at least in part disabled based on the change in the position input.

* * * * *